United States Patent
Hung et al.

(10) Patent No.: US 8,594,858 B2
(45) Date of Patent: Nov. 26, 2013

(54) METHOD OF CONTROLLING HEAT-DISSIPATING FAN OF COMPUTER DEVICE

(75) Inventors: Jia-Yu Hung, Taipei (TW); Chang-Yuan Wu, Taipei (TW); Ifeng Hsu, Taipei (TW); Ting-Wei Hsu, Taipei (TW); Peng Hsiang Sung, Taipei (TW); Hsiang-Chen Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 344 days.

(21) Appl. No.: 13/137,090

(22) Filed: Jul. 20, 2011

(65) Prior Publication Data
US 2012/0265363 A1 Oct. 18, 2012

(30) Foreign Application Priority Data
Apr. 14, 2011 (TW) .............................. 100112988 A (51) Int. Cl.
G05D 23/00 (2006.01)
(52) U.S. Cl.
USPC .............................. 700/300; 318/471; 600/27
(58) Field of Classification Search
USPC .............................. 700/300; 600/27; 318/471
See application file for complete search history.

(56) References Cited

U.S. PATENT DOCUMENTS

| 5,818,117 | A * | 10/1998 | Voss et al. ................... 290/40 A |
| 6,396,231 | B1 * | 5/2002 | Horng et al. .................. 318/471 |
| 7,228,204 | B2 * | 6/2007 | Iino et al. ..................... 700/300 |
| 2002/0112489 | A1 * | 8/2002 | Egawa et al. ................... 62/133 |
| 2003/0066638 | A1 * | 4/2003 | Qu et al. ....................... 165/186 |
| 2007/0027580 | A1 * | 2/2007 | Ligtenberg et al. ........... 700/300 |
| 2007/0081888 | A1 * | 4/2007 | Harrison ......................... 415/47 |
| 2008/0071136 | A1 * | 3/2008 | Oohashi et al. ................. 600/27 |
| 2008/0229782 | A1 * | 9/2008 | Takegami et al. .............. 62/513 |
| 2010/0204540 | A1 * | 8/2010 | Oohashi et al. ................. 600/27 |

* cited by examiner

Primary Examiner — Mohammad Ali
Assistant Examiner — Anthony Whittington
(74) Attorney, Agent, or Firm — Bacon & Thomas, PLLC (57) ABSTRACT

The present invention relates to a method of controlling a heat-dissipating fan of a computer device, which is provided with a heat-dissipating fan, a controller, a first sensor unit, and a second sensor unit. The method of the present invention includes the following steps. First, the controller accepts a first signal and a second signal and controls the rotating speed of the heat-dissipating fan according to the first signal. Subsequently, the controller determines the first signal and the second signal. Next, the controller reduces the rotating speed of the heat-dissipating fan corresponding to the first signal to temporarily maintain the rotating speed at a constant to thereby reduce a noise value produced by the heat-dissipating fan.

22 Claims, 4 Drawing Sheets

METHOD OF CONTROLLING HEAT-DISSIPATING FAN OF COMPUTER DEVICE

CROSS REFERENCE TO RELATED APPLICATION

This application claims the benefits of the Taiwan Patent Application Serial Number 100112988, filed on Apr. 14, 2011, the subject matter of which is incorporated herein by reference.

BACKGROUND OF THE INVENTION

1. Field of the Invention

The present invention relates to a method of controlling a heat-dissipating fan of a computer device and, more particularly, to a method of controlling a heat-dissipating fan of a computer device that has reduced power consumption and noises.

2. Description of Related Art

Computers such as notebook computers or desk computers are important tools for daily use in browsing web pages, message passing, or data searching. During the operation of the computers, heat release is one serious problem that may cause computers to crash/down or may lower the processing speed of the CPU (central processing unit). Therefore, heat-dissipating fans are usually installed on the computer case or on the CPUs to maintain a favorable temperature during the operation.

Heat-dissipating fans are typically designed to discharge heat when the inner part of the computer has a high temperature. As a result, those heat-dissipating fans are under continuous operation or the heat may not be dissipated out of the computer. However, such long time period operation may raise electricity consumption and generate noises, and thus may bring some negative influence to the users. Accordingly, a heat-dissipating fan with a thermister (i.e. thermal resistor) has been proposed, which is able to adjust the resist value as well as the electrical current provided to the heat-dissipating fan depending upon the surrounding temperature. Nevertheless, such controlled heat-dissipating fan still cannot solve the problems about noise, and cannot precisely control the rotating speed of the fan blades.

Therefore, it is desirable to provide an improved method to smartly control thermal dissipation of a computer, which can provide different operation modes for thermal dissipation under different situations of the computer and can effectively maintain the noise produced by the heat-dissipating fan of the computer in a predetermined decibel (dB) range, even in a long time operation, so as to mitigate the aforementioned problems.

SUMMARY OF THE INVENTION

An object of the present invention is to provide a method of controlling a heat-dissipating fan of a computer, which can reduce the noise produced by the heat-dissipating fan of the computer apparatus to a predetermined decibel (dB) range.

An object of the present invention is to provide a method of controlling a heat-dissipating fan of a computer, which can use a controller to drive a heat-dissipating fan of the computer device and adaptively adjust the rotating speed of the heat-dissipating fan, so as to effectively control the rotating speed, and reduce the noise produced by a heat-dissipating fan of the computer device to a predetermined decibel range, and avoid power consuming of the heat-dissipating fan due to the long time, high speed operation.

To achieve the objects of the invention, a method of controlling a heat-dissipating fan of a computer device is provided, which comprises steps: (A) using a first sensor unit to detect an inner status of the computer device to thereby output a first signal, and using a second sensor unit to detect an outer status of the computer device to thereby output a second signal; (B) using a controller to receive the first signal to thereby control the heat-dissipating fan to operate at a rotating speed based on the first signal, wherein the controller is connected to the first sensor unit; (C) using the controller to compare the first signal with a first setting, and using the controller to determine whether the second signal is received, wherein the controller is connected to the second sensor unit; (D) using the controller to reduce the rotating speed of the heat-dissipating fan when the controller determines that the first signal is not greater than the first setting and that a time interval in which the controller does not receive the second signal is greater than a second setting, so as to reduce a noise value produced by the heat-dissipating fan; (E) using the first signal to adjust the rotating speed when the controller determines that the first signal is greater than the first setting or the second signal is received; and (F) continuously using the controller to determine the first signal and the second signal for controlling the heat-dissipating fan.

According to an aspect of the invention, the second sensor unit for detecting the outer status of the computer device does not output the second signal unless the outer status is changed. Namely, when the outer status of the computer device remains unchanged, the second sensor unit does not output the second signal.

To achieve the objects of the invention, another method of controlling a heat-dissipating fan of a computer device is provided, which comprises: (A) using a first sensor unit to detect an inner status of the computer device to thereby output a first signal, and using a second sensor unit to detect an outer status of the computer device to thereby output a second signal; (B) using a controller to receive the first signal and the second signal to thereby control the heat-dissipating fan to operate at a rotating speed based on the first signal, wherein the controller is connected to the first sensor unit and the second sensor unit; (C) using the controller to compare the first signal with a first setting and determine whether the second signal is changed; (D) using the controller to reduce the rotating speed of the heat-dissipating fan when the controller determines that the first signal is not greater than the first setting and that a time interval in which the second signal remains unchanged is greater than a second setting, so as to reduce a noise value produced by the heat-dissipating fan; (E) using the first signal to adjust the rotating speed when the controller determines that the first signal is greater than the first setting or that the received second signal is changed; and (F) continuously using the controller to determine the first signal and the second signal for controlling the heat-dissipating fan.

According to another aspect of the invention, the second sensor unit for detecting the outer status of the computer device can continuously output the same unchanged second signal until an outer status change is detected. Namely, when the outer status of the computer device remains unchanged, the second signal continuously output from the second sensor unit remains unchanged.

In the proposed aspects of the above two methods of controlling a heat-dissipating fan of a computer device according to the present invention, the computer device can be a smart computer device such as a notebook, a desktop computer, or a smart processing system, but is not limited thereto. The computer device may be provided with a heat-dissipating fan, a controller, a first sensor unit, a second sensor unit, and an electronic device. In addition, the computer device can further comprise a non-volatile storage unit, which can prevent a temperature/decibel comparison table stored therein from being lost. Herein, the temperature/decibel comparison table is used by the controller to control the rotating speed of the heat-dissipating fan.

The temperature/decibel comparison table may contain a plurality of temperature ranges, for example, a range between 45° C. and 100° C., and preferably a range between 60° C. and 90° C. In this table, each temperature range corresponds to a noise value corresponding to a rotating speed of the heat-dissipating fan. In the present invention, the predetermined time interval (the second setting) can be 5 to 30 minutes, and preferable 10 to 15 minutes, and the noise value is predetermined from 30 to 32 dB, and preferably at 31 dB. Accordingly, when the second sensor unit determines that the idle time of the electronic device exceeds 15 minutes, and the temperature detected by the first sensor unit ranges between 65° C. and 90° C., the controller reduces the rotating speed of the heat-dissipating fan in order to keep the noise value produced by the heat-dissipating fan to be at 31 dB.

The controller in the invention can be an embedded controller of a notebook, or a separate processor, but is not limited thereto. Accordingly, the controller is designed to connect the first sensor unit, the second sensor unit and the heat-dissipating fan in order to receive the first signal output by the first sensor unit and the second signal output by the second sensor unit. In addition, the controller can control the operation of the heat-dissipating fan in order to provide a thermal dissipation to the electronic device. Namely, the controller controls the rotating speed of the heat-dissipating fan by controlling the voltage or current input to the heat-dissipating fan to further control the heat-dissipating fan to provide the thermal dissipation to the electronic device.

In the present invention, the first sensor unit can be a temperature detector, a processing speed detector, a usage rate detector, or a clock detector for sensing the inner status of the computer device, but is not limited thereto. The inner status of the computer device includes, for example, the temperature of the electronic device, the processing speed, the usage rate, or the clock. When the first sensor unit is a temperature detector, the inner status of the computer device can indicate/represent a temperature of an electronic component of the computer device or a temperature of the electronic device which is detected by the first sensor unit (temperature detector), and the first setting is related to a temperature setting value. When the first sensor unit is a processing speed detector, the inner status of the computer device can indicate a processing speed of the electronic component of the electronic device that is detected/calculated by the first sensor unit (processing speed detector). When the first sensor unit is a usage rate detector, the inner status of the computer device can indicate a usage rate of the electronic component of the electronic device that is detected/calculated by the first sensor unit (usage rate detector). When the first sensor unit is a clock detector, the inner status of the computer device can indicate a clock of the electronic component of the electronic device that is detected by the first sensor unit (clock detector). Herein, the electronic component can be a graphic chip, a control chip, or a central processing unit, but is not limited thereto.

In the present invention, the second sensor unit can be an input sensor, a proximity sensor, or an image sensor to sense the outer status of the computer device, but is not limited thereto. The outer status includes, for example, an operating state of the computer device, an image state, and a state of approaching an object to the electronic device. When the second sensor unit is an input sensor, the outer status of the computer device can indicate whether the second sensor unit (input sensor) detects that an input device is touched or used by a user or not, in which the input device connects the computer device and maybe a keyboard, mouse, touch panel or combination thereof. When the second sensor unit is a proximity sensor, the outer status of the computer device can indicate whether a user approaches the electronic device or not. When the second sensor unit is an image sensor, the outer status of the computer device can indicate whether a person stands in front of the image sensor or not. The image sensor can be a video camera or a camera, but is not limited thereto.

Therefore, the present invention provides a method of controlling a heat-dissipating fan of a computer device, wherein a controller can repeatedly use the first signal output by the first sensor unit and the second signal output by the second sensor unit to adjust the rotating speed of the heat-dissipating fan to ensure the inhibition of overheating problems and to effectively reduce the power consumption of the heat-dissipating fan without sacrificing the heat dissipation efficiency, to thereby reduce the noise produced by the heat-dissipating fan.

Other objects, advantages, and novel features of the invention will become more apparent from the following detailed description when taken in conjunction with the accompanying drawings.

DETAILED DESCRIPTION OF THE PREFERRED EMBODIMENT

[First Embodiment]

Figure 1A:
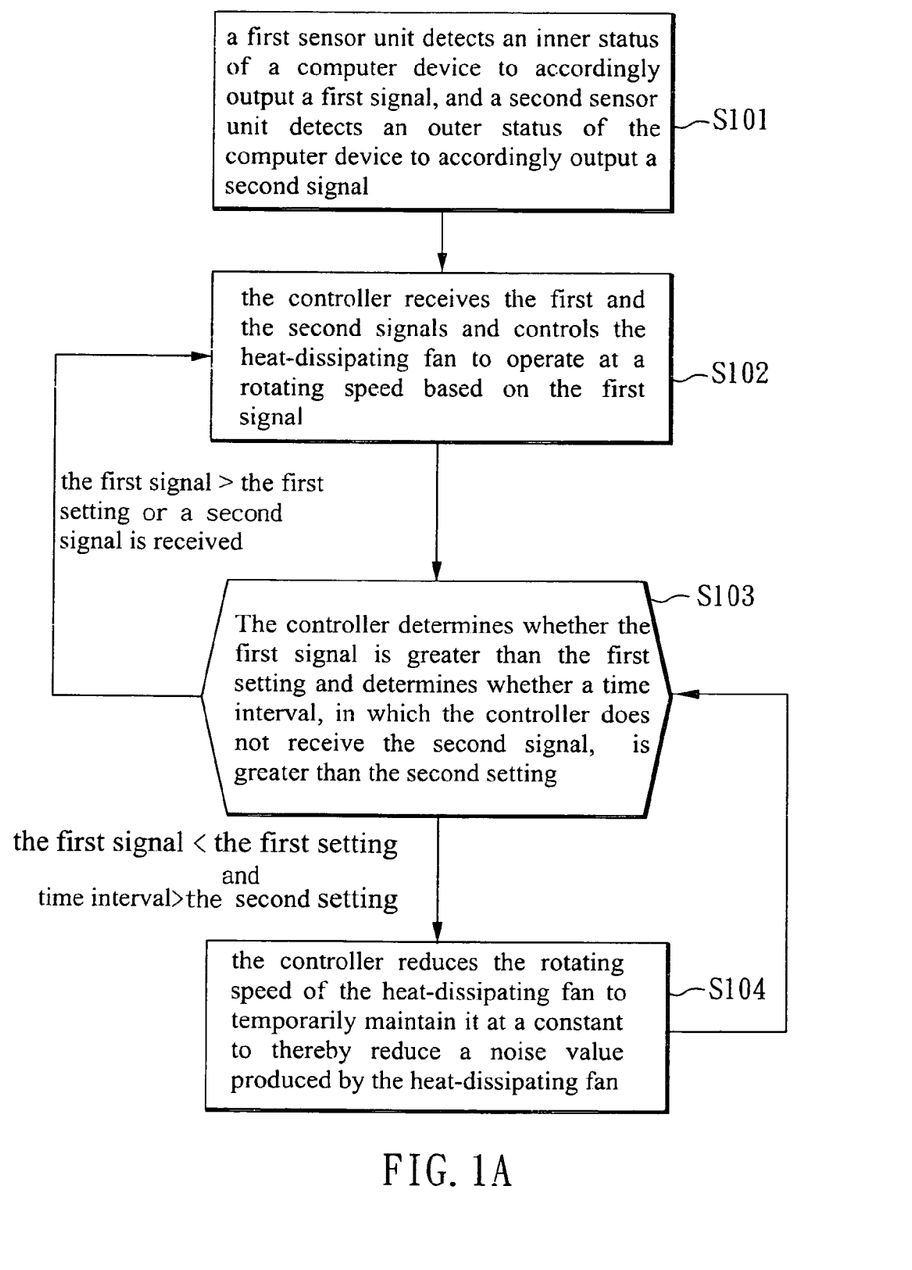
FIG. 1A is a flowchart of a method of controlling a heat-dissipating fan of a computer device according to a first embodiment of the present invention.

FIG. 1A is a flowchart of a method of controlling a heat-dissipating fan of a computer device according to a first embodiment of the invention. As shown in FIG. 1A, the method includes the steps as follows.

First, a first sensor unit detects an inner status of a computer device to accordingly output a first signal, and a second sensor unit detects an outer status of the computer device to accordingly output a second signal (step S101). The inner status of the computer device can indicate a temperature of the computer device or of an electronic component of the computer device, a processing speed of an electronic component of the computer device, a usage rate of an electronic component of the computer device, or a clock of an electronic component of the computer device. The outer status of the computer device can indicate an operating state of an input unit, a state of an image detected by a video camera, or a state of an object approaching to an electronic device. The inner and the outer status of the computer device can be defined with different product designs, and the different first and second sensor units in operation can be selected according to the inner and the outer status. When the outer status of the computer device is changed, the second sensor unit outputs a second signal; and when the outer status of the computer device is not changed, no second signal is output.

Next, the controller receives the first signal and controls the heat-dissipating fan to operate at a rotating speed based on the first signal (step S102).

Then, the controller compares the first signal with a first setting in order to determine whether the first signal is greater than the first setting. The controller compares a time interval, in which the controller does not receive the second signal, with a second setting in order to determine whether the time interval is greater than the second setting (step S103). In this case, the controller can be a typical processor or embedded controller, and the second signal is not output by the second sensor unit unless the outer status of the electronic device detected by the second sensor unit is changed. Therefore, in the method of the present invention, the controller determines whether the second signal is received or not while receiving and determining the first signal at the same time, for the following processes. The second setting can be a predetermined time interval, and the first setting can indicate a temperature value when the first sensor unit is a temperature sensor.

When the controller determines that the first signal is not greater than the first setting and that the time interval, in which the controller does not detect the second signal, exceeds a second setting, the controller reduces the rotating speed of the heat-dissipating fan to temporarily maintain it at a constant to thereby reduce a noise value produced by the heat-dissipating fan (step S104). When the controller determines that the first signal is greater than the first setting or the controller receives the second signal, the heat-dissipating fan is operated at a rotating speed corresponding to the first signal.

Finally, the procedure continuously returns to step S103, and through the controller to determine on the first signal and the second signal for controlling the heat-dissipating fan (as shown in FIG. 1A).

[Second Embodiment]

Figure 1B:
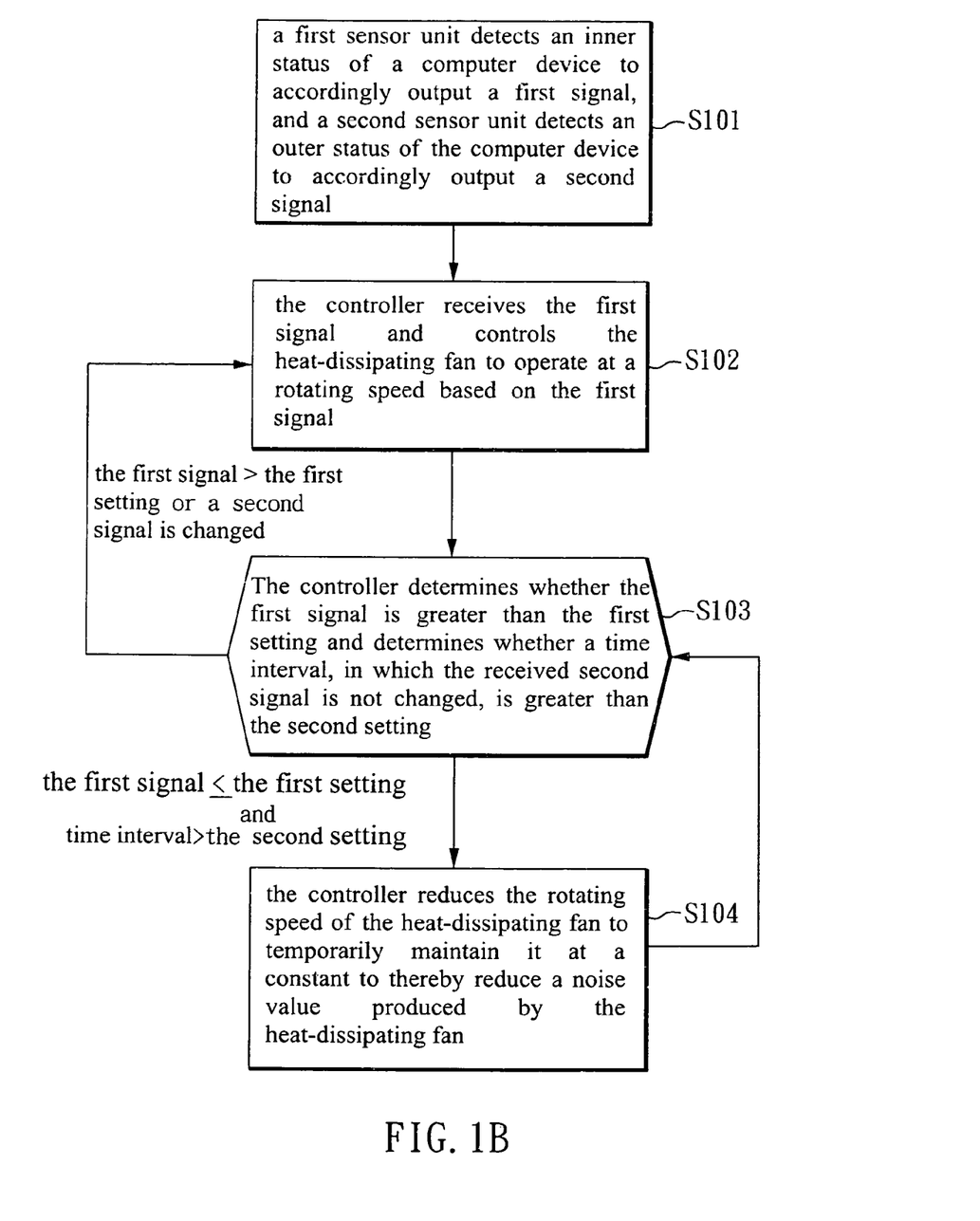
FIG. 1B is a flowchart of a method of controlling a heat-dissipating fan of a computer device according to a second embodiment of the present invention.

FIG. 1B is a flowchart of a method of controlling a heat-dissipating fan of a computer device according to a second embodiment of the present invention. As shown in FIG. 1B, the method includes the steps as follows.

Firstly, the first sensor unit detects an inner status of the computer device to accordingly output a first signal, and the second sensor unit detects an outer status of the computer device to accordingly output a second signal (step S101).

In this case, the inner status of the computer device can indicate a temperature of the computer device or of an electronic component of the computer device, a processing speed of an electronic component of the computer device, a usage rate of an electronic component of the computer device, or a clock of an electronic component of the computer device. The outer status of the computer device can indicate an operating state of an input unit, a state of an image detected by a video camera, or a state of an object approaching an electronic device. The inner and the outer status of the computer device can be defined with different product designs, and the different first and second sensor units in operation can be selected according to the inner and the outer status. When the outer status of the computer device is changed, the second signal output by the second sensor unit is changed; and when the outer status of the computer device is not changed, the second signal output by the second sensor unit remains unchanged.

Next, the controller receives the first and the second signals, and controls the heat-dissipating fan to operate at a rotating speed based on the first signal (step S102).

Next, the controller compares the first signal with a first setting in order to determine whether the first signal is greater than the first setting. At the same time, the controller compares a time interval, in which the second signal received by the controller does not change, with a second setting in order to determine whether the time interval is greater than the second setting (step S103). With different product designs and different second sensor units, the second sensor unit in this case can output the same unchanged second signal repeatedly, until the electronic device is operated by a user and is detected by the second sensor unit. Therefore, in the method of the present invention, when the controller receives and determines the first signal, the controller should also determine whether the second signal is changed at the same time, for the following processes.

When the controller determines that the first signal is not greater than the first setting and the time interval, in which the second signal remains unchanged, is greater than the second setting, the controller reduces the rotating speed of the heat-dissipating fan to temporarily maintain it at a constant to thereby reduce a noise value produced by the heat-dissipating fan (step S104). When the controller determines that the first signal is greater than the first setting or the second signal is changed, the heat-dissipating fan is operated at a rotating speed corresponding to the first signal.

Finally, the procedure continuously returns to step S103, and through the controller to determine on the first signal and the second signal for controlling the heat-dissipating fan (as shown in FIG. 1B).

Figure 2:
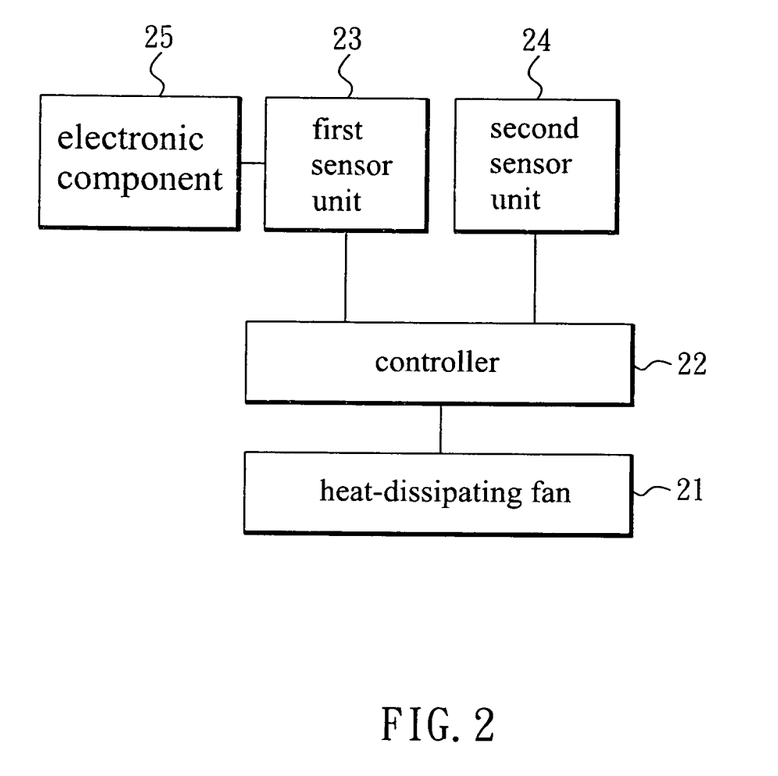
FIG. 2 is a block diagram of a system configuration of a computer device with a heat-dissipating fan according to an embodiment of the present invention.

FIG. 2 is a block diagram of a system configuration of a computer device with a heat-dissipating fan according to an embodiment of the present invention. The computer device can be a notebook, a desktop, or a smart processing system. As shown in FIG. 2, the computer device includes a heat-dissipating fan 21, a controller 22, a first sensor unit 23, a second sensor unit 24, and an electronic component 25° The controller 22 is connected to the first sensor unit 23, the second sensor unit 24, and the heat-dissipating fan 21. The controller 22 receives a first signal output by the first sensor unit 23 and a second signal output by the second sensor unit 24, and controls the operation of the heat-dissipating fan 21 to discharge the heat generated by the electronic component 25 via controlling the voltage or current input to the heat-dissipating fan to further control the rotating speed. Upon different product designs, the controller 22 can be an embedded controller of a notebook or a separate processor, and the electronic component 25 can be a graphic chip, control chip, or central processing unit of the computer device.

When the first sensor unit 23 is a temperature detector, it can detect the temperature of the electronic component 25 or the temperature inside the electronic device. When the first sensor unit is a processing speed detector, the first sensor unit detects/calculates a processing speed of the electronic component 25. When the first sensor unit is a usage rate detector, the first sensor unit detects/calculates a usage rate of the electronic component. When the first sensor unit is a clock detector, the first sensor unit detects a clock of the electronic component 25. In this embodiment, the first sensor unit is a temperature detector, but is not limited thereto.

When the second sensor unit 24 is an input sensor, it detects whether an input device is touched or used by a user or not. Herein, the input device is connected to the computer device, and can be a keyboard, mouse, touch panel or combination thereof. When the second sensor unit is a proximity sensor, it detects whether a user approaches the electronic device. When the second sensor unit is an image sensor, it detects whether a person stands in front of the image sensor. The image sensor can be a video camera or a camera. In this embodiment, the second sensor unit 24 is an input sensor, but is not limited thereto.

Accordingly, when the first sensor unit 23 is the temperature detector and the second sensor unit 24 is the input sensor, the controller 22 receives the first signal output by the first sensor unit 23 and the second signal output by the second sensor unit 24, and controls the heat-dissipating fan 21 to operate at a rotating speed based on the first signal. Next, the controller 22 receives the first signal and the second signal output by the second sensor unit 24 again, and determines whether the first signal is greater than a first setting and whether the second signal is changed. With the different product designs, the controller 22 receives the first signal and also determines whether the second signal output by the second sensor unit 24 is received or whether the second signal received is changed. In this case, the first sensor unit 23 detects the temperature of the electronic component 25 of the computer device in order to output the first signal based on the temperature. The second sensor unit 24 detects an input device, such as a keyboard, touch panel, mouse, or combination thereof, built-in or externally connected to the electronic device to determine whether the input device is touched or used by a user. When the input device is touched or used, the second sensor unit 24 outputs the second signal, or the second signal output by the second sensor unit 24 is changed and then further output to the controller.

When the controller 22 receives the first signal, the heat-dissipating fan 21 is driven according to a detected temperature corresponding to the first signal and a comparison table. With the different product designs, the comparison table can be a temperature/rotating speed or temperature/decibel comparison table. In this embodiment, the comparison table is the temperature/decibel comparison table, but is not limited thereto. The temperature/decibel comparison table has a plurality of temperature ranges, for example a range between 45 and 100° C., each range corresponding to a noise decibel value (dB), depending on the rotating speed of the heat-dissipating fan, as shown in Table 1 later. Next, the controller 22 determines whether the first signal is greater than the first setting, and determines whether a time interval, in which the controller does not receive the second signal or the second signal is not changed, is greater than a second setting. When the controller 22 determines that the time interval, in which the second signal remains unchanged, is greater than a second setting or that the time interval, in which the second signal is not received, is greater than the second setting, it indicates that a user does not operate the electronic device for a period of time. When it is determined that the first signal is greater than the first setting, or that the controller receives the second signal or a changed second signal, the controller 22 drives the heat-dissipating fan 21 based on the received first signal and the comparison table, to thereby operate the heat-dissipating fan 21 at an appropriate rotating speed. When it is determined that the first signal is not greater than the first setting, or the time interval is greater than the second setting, it indicates that the computer device is idle for a period of time, and in this case the controller 22 reduces the rotating speed of the heat-dissipating fan 21 to keep the noise produced by the heat-dissipating fan at a predetermined noise value. Therefore, the computer device can be used in a lower noise environment and can also avoid computers crashing/down due to overheating. After the rotating speed of the heat-dissipating fan 21 is reduced, the controller still continuously receives the first and the second signals for adaptively adjusting the rotating speed of the heat-dissipating fan 21.

Referring to the temperature/decibel comparison table in Table 1, in this embodiment, the predetermined time interval is defined as 10 to 20 minutes, preferably 15 minutes; the temperature is set to a range between 60° C. to 90° C.; and the produced noise value is predetermined 30-32 dB, preferably at 31 dB. Thus, when the second sensor unit 24 determines that the electronic device exceeds 15 minutes at idle, and the first sensor unit 23 detects that the temperature of the electronic component 25 ranges between 65° C. and 90° C., the controller 22 reduces the rotating speed of the heat-dissipating fan 21 in order to maintain the noise level of heat-dissipating fan 21 at 31 dB.

TABLE 1

Temperature/Decibel Comparison Table

| Noise (dBA) | Lower Limit of Temperature (° C.) | Upper Limit of Temperature (° C.) |
|---|---|---|
| 0 | — | 50 |
| 28 | 45 | 60 |
| 31 | 55 | 70 |
| 34 | 65 | 80 |
| 37 | 75 | 90 |
| 40 | 85 | 100 |
| Fan throttle | 91 | 104 |
| Fan off | | 104 |

Therefore, the controller 22 is able to adjust the rotating speed of the heat-dissipating fan based on the temperature/decibel comparison table and the temperature detected from the electronic component 25 of the computer device, and therefore to save the power consumed by the heat-dissipating fan in a long time, high speed operation and to thereby reduce the noise produced by the heat-dissipating fan 21.

Figure 3:
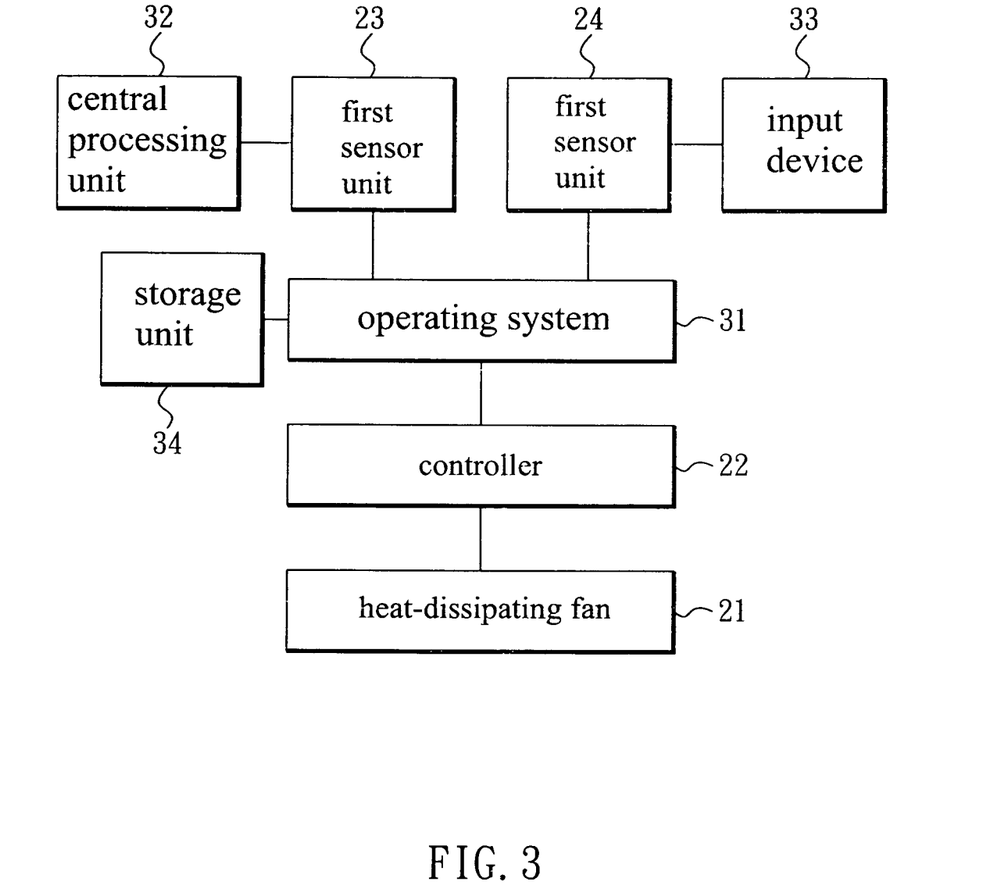
FIG. 3 is a block diagram of a system configuration of a computer device with a heat-dissipating fan according to another embodiment of the present invention.

FIG. 3 is a block diagram of a system configuration of a computer device with a heat-dissipating fan according to another embodiment of the present invention. In this system configuration, in addition to the heat-dissipating fan 21, the controller 22, the first sensor unit 23, and the second sensor unit 24 shown in FIG. 2, the computer device further includes an operating system (OS) 31, and the temperature/decibel comparison table is stored in a storage unit 34 (such as a non-volatile memory). The operating system 31 can be a Microsoft OS to be a bridge to drive the first sensor unit 23, the second sensor unit 24, the storage unit 34, and the controller 22. When the first sensor unit 23 is a temperature detector, and the second sensor unit 24 is an input sensor, the first sensor unit 23 detects the temperature of the central processing unit 32 of the computer device while the second sensor unit 24 detects if the input device 33 is working or not. The input device 33 can be a touch panel, keyboard, buttons, or combination thereof. The results detected by the first and the second sensor units are output to the controller 22 through the operating system 31.

Accordingly, the controller 22 can reference and accord the temperature/decibel comparison table and the detected temperature to drive the heat-dissipating fan 21. When the input device 33 is idle for a period of time over a predetermined time (15 minutes), and the detected temperature of the central processing unit 32 does not exceed a predetermined temperature range (60° C. to 90° C.), the controller instructs the heat-dissipating fan 21 to reduce its rotating speed and maintains it at the reduced rotating speed. Thus, the noise produced by the heat-dissipating fan can be kept at a constant (by 31 dB) so as to save the power consumed by the heat-dissipating fan 21 in operation and effectively control and reduce the noise produced by the heat-dissipating fan 21.

Although the present invention has been explained in relation to its preferred embodiment, it is to be understood that many other possible modifications and variations can be made without departing from the spirit and scope of the invention as hereinafter claimed.

What is claimed is:

1. A method of controlling a heat-dissipating fan of a computer device, which comprises steps:
   (A) using a first sensor unit to detect an inner status of the computer device to thereby output a first signal, and using a second sensor unit to detect an outer status of the computer device to thereby output a second signal;
   (B) using a controller to receive the first signal to thereby control the heat-dissipating fan to operate at a rotating speed based on the first signal, wherein the controller is connected to the first sensor unit;
   (C) using the controller to compare the first signal with a first setting, and using the controller to determine whether the second signal is received, wherein the controller is connected to the second sensor unit;
   (D) using the controller to reduce the rotating speed of the heat-dissipating fan when the controller determines that the first signal is not greater than the first setting and that a time interval in which the controller does not receive the second signal is greater than a second setting, so as to reduce a noise value produced by the heat-dissipating fan;
   (E) using the first signal to adjust the rotating speed when the controller determines that the first signal is greater than the first setting or the second signal is received; and
   (F) continuously using the controller to determine the first signal and the second signal for controlling the heat-dissipating fan.

2. The method as claimed in claim 1, wherein the first sensor unit is a temperature detector, the inner status indicates a temperature of an electronic component of the computer device detected by the temperature detector, the first setting is a setting value associated with temperature, and the electronic component is a graphic chip, a control chip, or a central processing unit.

3. The method as claimed in claim 1, wherein the first sensor unit is a processing speed detector, the inner status indicates a processing speed of an electronic component of the computer device which is detected or calculated by the processing speed detector, and the electronic component is a graphic chip, a control chip, or a central processing unit.

4. The method as claimed in claim 1, wherein the first sensor unit is a usage rate detector, the inner status indicates a usage rate of an electronic component of the computer device which is detected or calculated by the usage rate detector, and the electronic component is a graphic chip, a control chip, or a central processing unit.

5. The method as claimed in claim 1, wherein the first sensor unit is a clock detector, the inner status indicates a clock of an electronic component of the computer device which is detected by the clock detector, and the electronic component is a graphic chip, a control chip, or a central processing unit.

6. The method as claimed in claim 1, wherein the second sensor unit is an input sensor, the outer status indicates that the input sensor detects an input device to be activated or not, and the input device is a keyboard, mouse, touch panel, or combination thereof.

7. The method as claimed in claim 1, wherein the computer device is a notebook computer.

8. The method as claimed in claim 1, wherein the second sensor unit is a proximity sensor, and the outer status indicates that the proximity sensor detects whether a user approaches the electronic device or not.

9. The method as claimed in claim 1, wherein the second sensor unit is an image sensor, and the outer status indicates that the image sensor detects a user standing in front of the image sensor or not.

10. The method as claimed in claim 1, wherein the second sensor unit outputs the second signal when the outer status of the computer device is changed; and the second sensor unit does not output the second signal when the outer status of the computer device is not changed.

11. The method as claimed in claim 1, wherein the first and the second signals are output to the controller through an operating system.

12. A method of controlling a heat-dissipating fan of a computer device, which comprises steps:
    (A) using a first sensor unit to detect an inner status of the computer device to thereby output a first signal, and using a second sensor unit to detect an outer status of the computer device to thereby output a second signal;
    (B) using a controller to receive the first signal and the second signal to thereby control the heat-dissipating fan to operate at a rotating speed based on the first signal, wherein the controller is connected to the first sensor unit and the second sensor unit;
    (C) using the controller to compare the first signal with a first setting and determine whether the second signal is changed;
    (D) using the controller to reduce the rotating speed of the heat-dissipating fan when the controller determines that the first signal is not greater than the first setting and that a time interval in which the second signal remains unchanged is greater than a second setting, so as to reduce a noise value produced by the heat-dissipating fan;
    (E) using the first signal to adjust the rotating speed when the controller determines that the first signal is greater than the first setting or that the received second signal is changed; and
    (F) continuously using the controller to determine the first signal and the second signal for controlling the heat-dissipating fan.

13. The method as claimed in claim 12, wherein the first sensor unit is a temperature detector, the inner status indicates a temperature of an electronic component of the computer device detected by the temperature detector, the first setting is a setting value associated with temperature, and the electronic component is a graphic chip, a control chip, or a central processing unit.

14. The method as claimed in claim 12, wherein the first sensor unit is a processing speed detector, the inner status indicates a processing speed of an electronic component of the computer device which is detected or calculated by the processing speed detector, and the electronic component is a graphic chip, a control chip, or a central processing unit.

15. The method as claimed in claim 12, wherein the first sensor unit is a usage rate detector, the inner status indicates a usage rate of an electronic component of the computer device which is detected or calculated by the usage rate detector, and the electronic component is a graphic chip, a control chip, or a central processing unit.

16. The method as claimed in claim 12, wherein the first sensor unit is a clock detector, the inner status indicates a clock of an electronic component of the computer device which is detected by the clock detector, and the electronic component is a graphic chip, a control chip, or a central processing unit.

17. The method as claimed in claim 12, wherein the second sensor unit is an input sensor, the outer status indicates that the input sensor detects an input device to be activated or not, and the input device is a keyboard, mouse, touch panel, or combination thereof.

18. The method as claimed in claim 12, wherein the computer device is a notebook computer.

19. The method as claimed in claim 12, wherein the second sensor unit is a proximity sensor, and the outer status indicates that the proximity sensor detects whether a user approaches the electronic device or not.

20. The method as claimed in claim 12, wherein the second sensor unit is an image sensor, and the outer status indicates that the image sensor detects a user standing in front of the image sensor or not.

21. The method as claimed in claim 12, wherein the second signal output by the second sensor unit is changed when the outer status of the computer device is changed; and the second signal output by the second sensor unit is not changed when the outer status of the computer device is not changed.

22. The method as claimed in claim 12, wherein the first and the second signals are output to the controller through an operating system.

* * * * *